United States Patent
Tojyo

[11] 4,166,674
[45] Sep. 4, 1979

[54] OBJECTIVE LENS SYSTEM FOR MICROSCOPES

[75] Inventor: Tsutomu Tojyo, Hachiouji, Japan

[73] Assignee: Olympus Optical Co., Ltd., Tokyo, Japan

[21] Appl. No.: 871,977

[22] Filed: Jan. 24, 1978

[30] Foreign Application Priority Data

Jan. 29, 1977 [JP] Japan .................. 52-9128

[51] Int. Cl.² ............................. G02B 21/02
[52] U.S. Cl. ............... 350/175 ML; 350/222
[58] Field of Search ............ 350/175 ML, 222

[56] References Cited
U.S. PATENT DOCUMENTS

| | | | |
|---|---|---|---|
| 2,644,943 | 7/1953 | Klein | 350/175 ML |
| 3,537,773 | 11/1970 | Klein | 350/175 ML |
| 3,744,881 | 7/1973 | Taira | 350/175 ML |

*Primary Examiner*—Conrad J. Clark
*Attorney, Agent, or Firm*—Cushman, Darby & Cushman

[57] ABSTRACT

An objective lens system for microscopes having a large N.A. and a long working distance comprising a first positive lens component, a second single or cemented meniscus lens component, a third negative cemented meniscus lens component and a fourth positive lens component. Said objective lens system is so designed as to satisfy the conditions enumerated hereunder:

(1) $f/4 < d_6 + d_7 < f/1.5$
(2) $0.1f < r_5 < 0.35f$
   $0.1f < -r_6 < 0.35f$
(3) $\nu_2 > 40$
   $\nu_5 \cdot \nu_8 > 55$
   $\nu_4 < 40$

8 Claims, 9 Drawing Figures

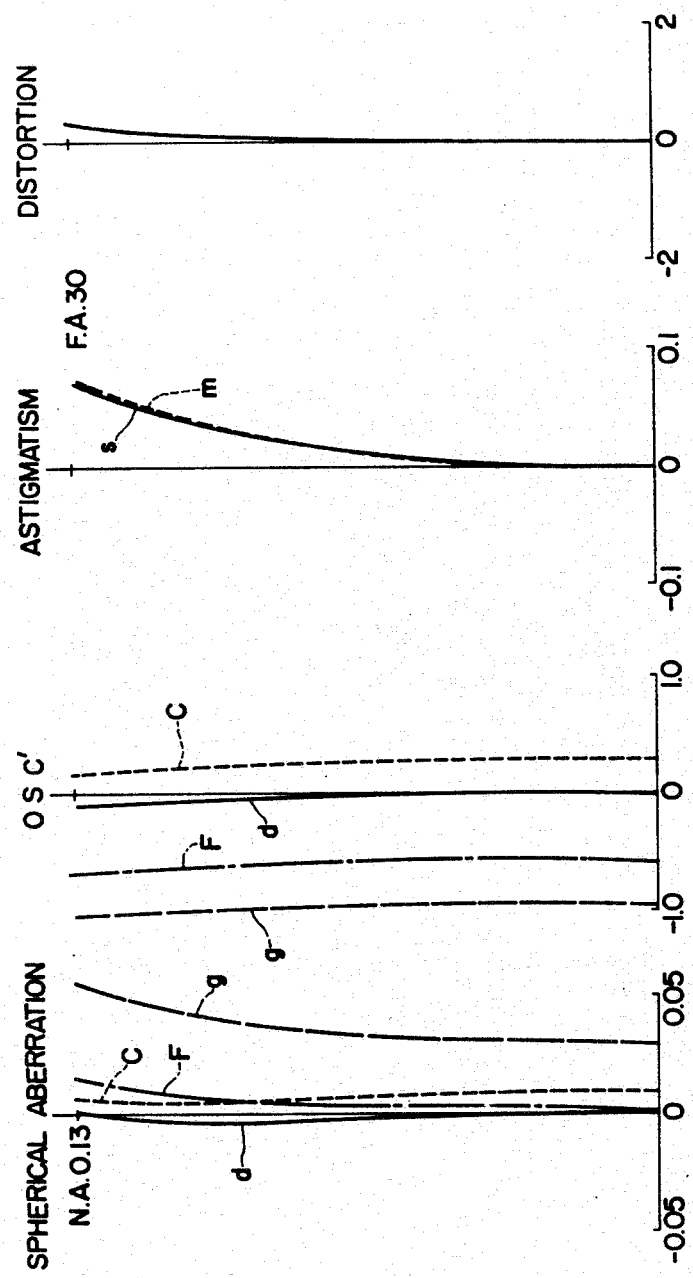
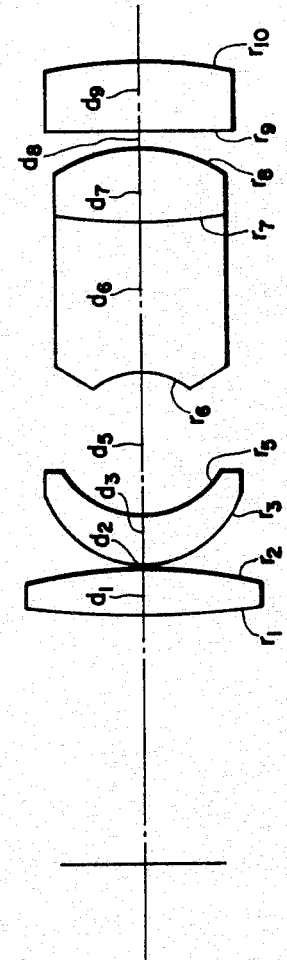
FIG. 5
FIG. 6

OBJECTIVE LENS SYSTEM FOR MICROSCOPES

BACKGROUND OF THE INVENTION (a) Field of the Invention

The present invention relates to a low magnification objective lens system for microscopes, and more specifically an objective lens system consisting of four lens components and having a long working distance and a large numerical aperture.

(b) Description of the Prior Art

As plan objective lens systems for microscopes, there have conventionally been known those which comprise two doublet lens components or four lens elements, etc. Most of the conventional low magnification objective lens systems of this type for microscopes had small N.A. of about 0.1 and working distances of about 0.2 when converted into distances corresponding to f=1. Further, these objective lens systems for microscopes were not satisfactory from a viewpoint of correction of aberrations since coma could not be corrected favorably and relatively large astigmatic differences remained in these objective lens systems for microscopes.

SUMMARY OF THE INVENTION

A general object of the present invention is to provide an objective lens system for microscopes which has a relatively large N.A. value and a long working distance and wherein aberrations are favorably corrected.

The objective lens system according to the present invention has such a composition as shown in FIG. 1, FIG. 4 or FIG. 6. Speaking more concretely, the objective lens system according to the present invention comprises four lens components: a first positive lens component, a second single or cemented meniscus lens component, a third negative cemented lens component and a fourth positive lens component. The objective lens system according to the present invention is characterized by the fact that it satisfies the conditions defined below:

(1) $f/4 < d_6 + d_7 < f/1.5$
(2) $0.1f < r_5 < 0.35f$
    $0.1f < -r_6 < 0.35f$
(3) $\nu_2 > 40$
    $\nu_5, \nu_6 > 55$
    $\nu_4 < 40$ wherein the reference symbols represent as follows:

$d_6 + d_7$: thickness of the third lens component $r_5$ and $r_6$: radii of curvature on the image side surface of the second lens component and on the object side surface of the third lens component $\nu_2, \nu_4, \nu_5$ and $\nu_6$: Abbe's numbers of the second lens component (or the object side lens element when the second lens component is a cemented doublet), both the elements of the third lens component and the fourth lens component.

In case of designing such an objective lens system for microscopes having a long working distance and a large numerical aperture as is provided by the present invention, the most difficult problem lies in favorably correcting chromatic aberration. That is to say, it is most important to realize the most favorable chromatic aberration within a practically permissible range by properly selecting, disposition of lens elements made of usable kinds of glass materials and distribution of refractive powers.

In order to favorably correct chromatic aberration mentioned above, it is required to limit dispersion of rays within a narrow range on the object side. For this purpose, a thick lens component must be arranged within an area near the object to be observed where the rays have large angles relative to the optical axis. However, arranging a thick lens component near the object will be contradictory to the object of the present invention to prolong the working distance. Therefore, the objective lens system according to the present invention uses a thick lens component (the third lens component) in the rear lens group which is designed as a cemented component for correcting chromatic aberration. Thickness ($d_6 + d_7$) of the third lens component is so selected as to be within the range defined by the condition (1). If $d_6 + d_7$ is smaller than f/4 in the condition (1), coma will be extremely aggravated, thereby degrading symmetry of coma. If $d_6 + d_7$ exceeds f/1.5, in contrast, it will be difficult to correct chromatic aberration favorably.

As an objective lens system having a flat image surface, there have conventionally been known a lens system wherein a lens component having a strongly concave surface on the image side is arranged in the rear lens group. However, this type of objective lens system has a defect to aggravate chromatic spherical aberration. Further, there have conventionally been known an objective lens system which is so designed as to provide a flat image surface by arranging a strongly meniscus lens as the front lens component and imparting a strongly negative refractive power to the object side concave surface of said front lens component. However, such a lens system is undesirable since it has a short effective working distance. Further, increasing thickness of the front lens component is also undesirable for the same reason.

The objective lens system according to the present invention is designed as a Gauss type lens system for the purpose of preferably avoiding correcting curvature of field by a front lens component and performing such correction by the other lens components. Speaking more concretely with reference to the objective lens system according to the present invention, radii of curvature $r_5$ and $r_6$ on the mutually facing surfaces of the second and third lens components are defined within the ranged of the condition (2) so as to correct curvature of field favorably. If the upper limits are exceeded in condition (2), Pettzval's sum is increased, thereby degrading flatness of the image surface. If the radii of curvature $r_5$ and $-r_6$ are smaller than the lower limits, coma will be aggravated, thereby making it impossible to obtain a proper balance between Petzval's sum and coma.

Finally, chromatic aberration is favorably corrected in the objective lens system according to the present invention by selecting large Abbe's numbers for the respective lens components as defined in the condition (3) and using a combination of highly and lowly dispersive materials for the third lens component. It will be impossible to correct chromatic aberration favorably when the condition (3) is not satisfied.

BRIEF DESCRIPTION OF THE DRAWINGS

FIG. 5 illustrates curves showing the aberration characteristics of the Embodiment 3;

FIG. 6 illustrates a sectional view showing the composition of the Embodiment 4;

DETAILED DESCRIPTION OF PREFERRED EMBODIMENTS

Figure 1:
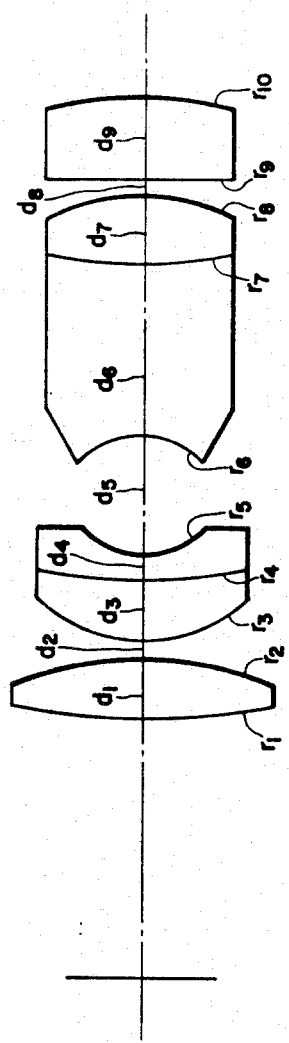
FIG. 1 shows a sectional view illustrating the compositions of the Embodiments 1 and 2 of the present invention.
Figure 2:
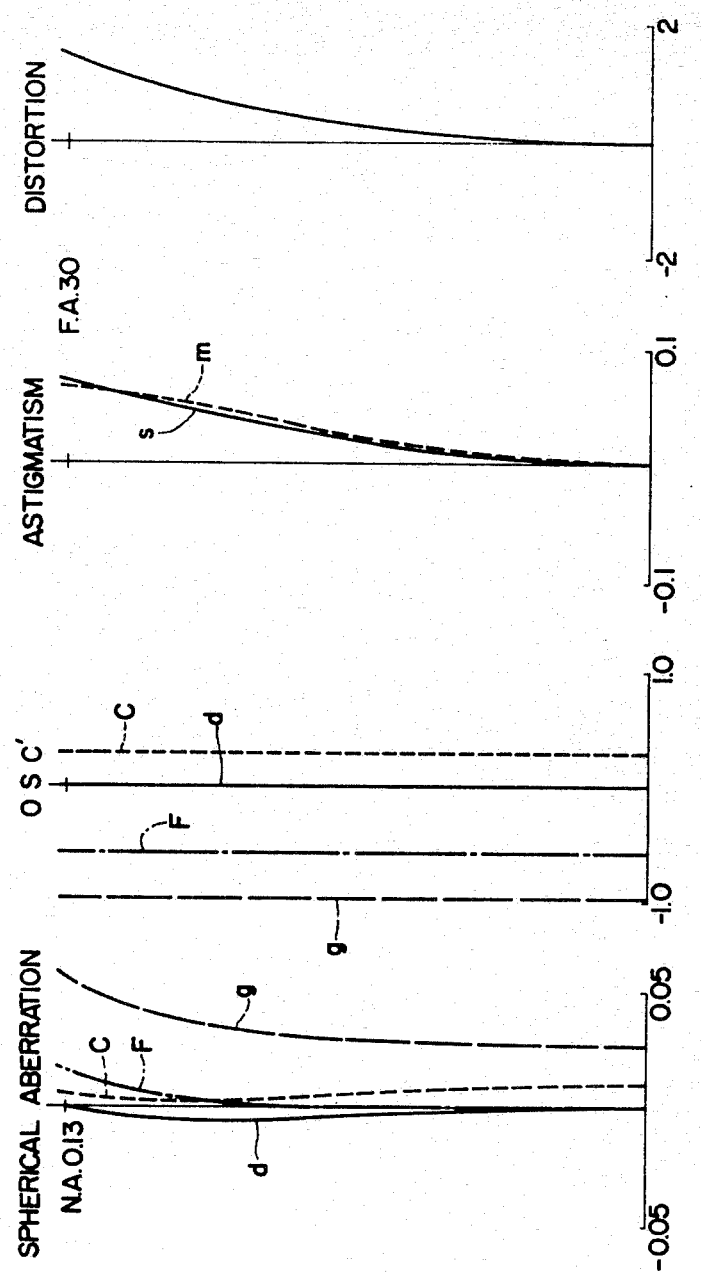
FIG. 2 shows curves illustrating the aberration characteristics of the Embodiment 1.

Now, some preferred embodiments of the present invention will be described detailedly below:

Embodiment 1

$f = 1.0$    $N.A. = 0.13$    $W.D. = 0.3638$ $r_1 = 1.0662$
$d_1 = 0.0774$    $n_1 = 1.77250$    $\nu_1 = 49.60$
$r_2 = -0.5293$
$d_2 = 0.0285$
$r_3 = 0.2136$
$d_3 = 0.0892$    $n_2 = 1.75500$    $\nu_2 = 52.33$
$r_4 = 0.8616$
$d_4 = 0.0334$    $n_3 = 1.73520$    $\nu_3 = 41.08$
$r_5 = 0.1374$
$d_5 = 0.1628$
$r_6 = -0.1352$
$d_6 = 0.2434$    $n_4 = 1.59270$    $\nu_4 = 35.29$
$r_7 = 0.8439$
$d_7 = 0.0941$    $n_5 = 1.49700$    $\nu_5 = 81.34$
$r_8 = -0.2823$
$d_8 = 0.0214$
$r_9 = 8.8577$
$d_9 = 0.1143$    $n_6 = 1.62041$    $\nu_6 = 60.27$
$r_{10} = -0.6290$

Embodiment 2

$f = 1.0$    $N.A. = 0.13$    $W.D. = 0.3603$ $r_1 = 0.9961$
$d_1 = 0.0713$    $n_1 = 1.79500$    $\nu_1 = 45.27$
$r_2 = -0.6766$
$d_2 = 0.0238$
$r_3 = 0.2095$
$d_3 = 0.0911$    $n_2 = 1.75500$    $\nu_2 = 52.33$
$r_4 = 0.7694$
$d_4 = 0.0371$    $n_3 = 1.73520$    $\nu_3 = 41.08$
$r_5 = 0.1352$
$d_5 = 0.1771$
$r_6 = -0.1362$
$d_6 = 0.2283$    $n_4 = 1.59270$    $\nu_4 = 35.29$
$r_7 = 0.8967$
$d_7 = 0.0797$    $n_5 = 1.49700$    $\nu_5 = 81.34$
$r_8 = -0.2796$
$d_8 = 0.0146$
$r_9 = 6.5466$
$d_9 = 0.1098$    $n_6 = 1.62041$    $\nu_6 = 60.27$
$r_{10} = -0.5686$

Embodiment 3

$f = 1.0$    $N.A. = 0.13$    $W.D. = 0.4190$ $r_1 = 3.3947$
$d_1 = 0.0894$    $n_1 = 1.80610$    $\nu_1 = 40.95$
$r_2 = -0.6104$
$d_2 = 0.0249$

-continued

Embodiment 3

$f = 1.0$    $N.A. = 0.13$    $W.D. = 0.4190$ $r_3 = 0.2267$
$d_3 = 0.0991$    $n_2 = 1.77250$    $\nu_2 = 49.60$
$r_4 = -0.3508$
$d_4 = 0.0275$    $n_3 = 1.72000$    $\nu_3 = 42.08$
$r_5 = 0.1658$
$d_5 = 0.1362$
$r_6 = -0.1420$
$d_6 = 0.2922$    $n_4 = 1.59270$    $\nu_4 = 35.29$
$r_7 = 0.7763$
$d_7 = 0.1122$    $n_5 = 1.49700$    $\nu_5 = 81.34$
$r_8 = -0.3476$
$d_8 = 0.0213$
$r_9 = 3.2004$
$d_9 = 0.1253$    $n_6 = 1.62041$    $\nu_6 = 60.27$
$r_{10} = -0.7606$

Embodiment 4

$f = 1.0$    $N.A. = 0.13$    $W.D. = 0.3781$ $r_1 = 1.5323$
$d_1 = 0.0758$    $n_1 = 1.75500$    $\nu_1 = 52.33$
$r_2 = -0.5965$
$d_2 = 0.0075$
$r_3 = 0.1647$
$d_3 = 0.0659$    $n_2 = 1.77250$    $\nu_2 = 49.60$
$r_5 = 0.1435$
$d_5 = 0.2139$
$r_6 = -0.1196$
$d_6 = 0.2262$    $n_4 = 1.59270$    $\nu_4 = 35.29$
$r_7 = 0.7513$
$d_7 = 0.1088$    $n_5 = 1.49250$    $\nu_5 = 81.90$
$r_8 = -0.2819$
$d_8 = 0.0262$
$r_9 = 10.9245$
$d_9 = 0.1125$    $n_6 = 1.62041$    $\nu_6 = 60.27$
$r_{10} = 0.6141$

Embodiment 5

$f = 1.0$    $N.A. = 0.13$    $W.D. = 0.4327$ $r_1 = 0.4378$
$d_1 = 0.0788$    $n_1 = 1.75500$    $\nu_1 = 52.33$
$r_2 = -1.5332$
$d_2 = 0.0072$
$r_3 = 0.2984$
$d_3 = 0.0719$    $n_2 = 1.76200$    $\nu_2 = 40.20$
$r_4 = -0.6620$
$d_4 = 0.0249$    $n_3 = 1.61340$    $\nu_3 = 43.84$
$r_5 = 0.1665$
$d_5 = 0.1372$
$r_6 = -0.1427$
$d_6 = 0.3226$    $n_4 = 1.66680$    $\nu_4 = 33.04$
$r_7 = 1.3593$
$d_7 = 0.1094$    $n_5 = 1.49700$    $\nu_5 = 81.60$
$r_8 = -0.3215$
$d_8 = 0.0214$
$r_9 = 2.1861$
$d_9 = 0.0864$    $n_6 = 1.62041$    $\nu_6 = 60.27$
$r_{10} = -0.9477$

Embodiment 6

$f = 1.0$    $N.A. = 0.13$    $W.D. = 0.4286$ $r_1 = 0.4452$
$d_1 = 0.0779$    $n_1 = 1.80610$    $\nu_1 = 40.95$
$r_2 = -2.3115$
$d_2 = 0.0071$
$r_3 = 0.2937$
$d_3 = 0.0698$    $n_2 = 1.77250$    $\nu_2 = 49.60$
$r_4 = -0.9199$
$d_4 = 0.0246$    $n_3 = 1.61340$    $\nu_3 = 43.84$

-continued

Embodiment 6

Figures 3, 4:
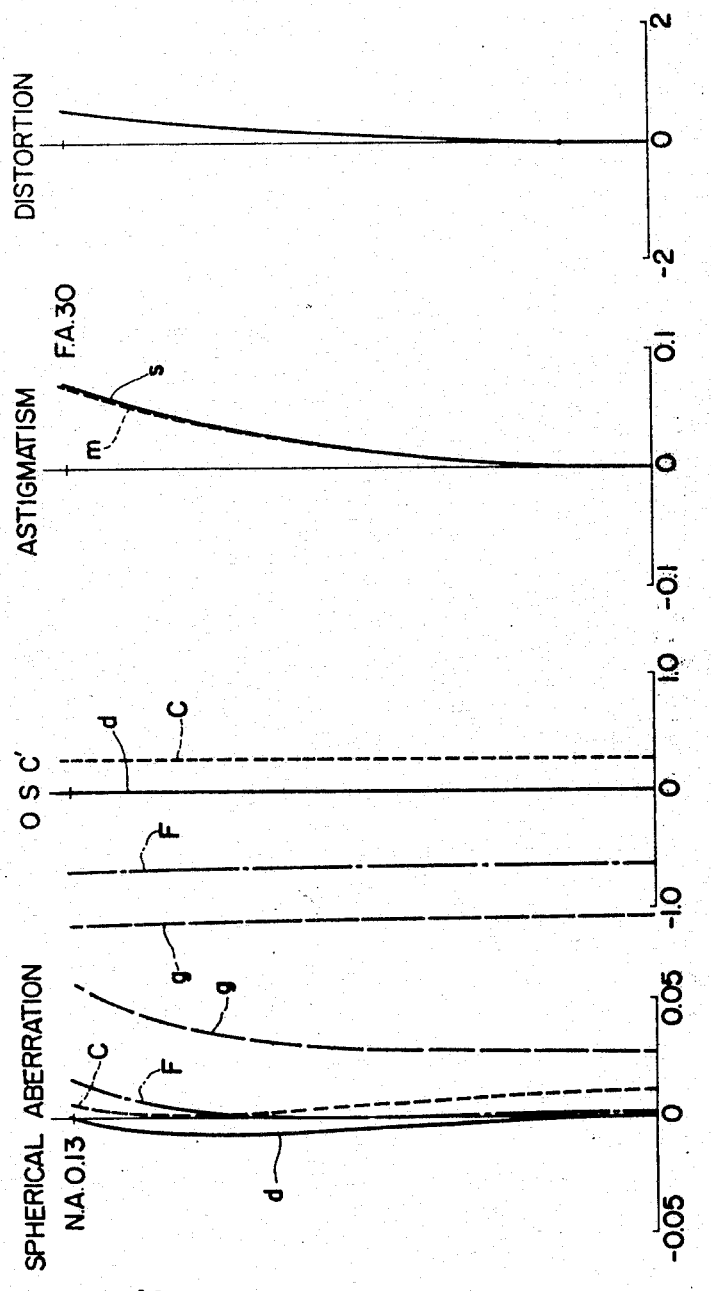
FIG. 3 shows graphs illustrating the aberration characteristics of the Embodiment 2.
FIG. 4 illustrates a sectional view showing the compositions of Embodiments 3, 5 and 6.
Figure 7:
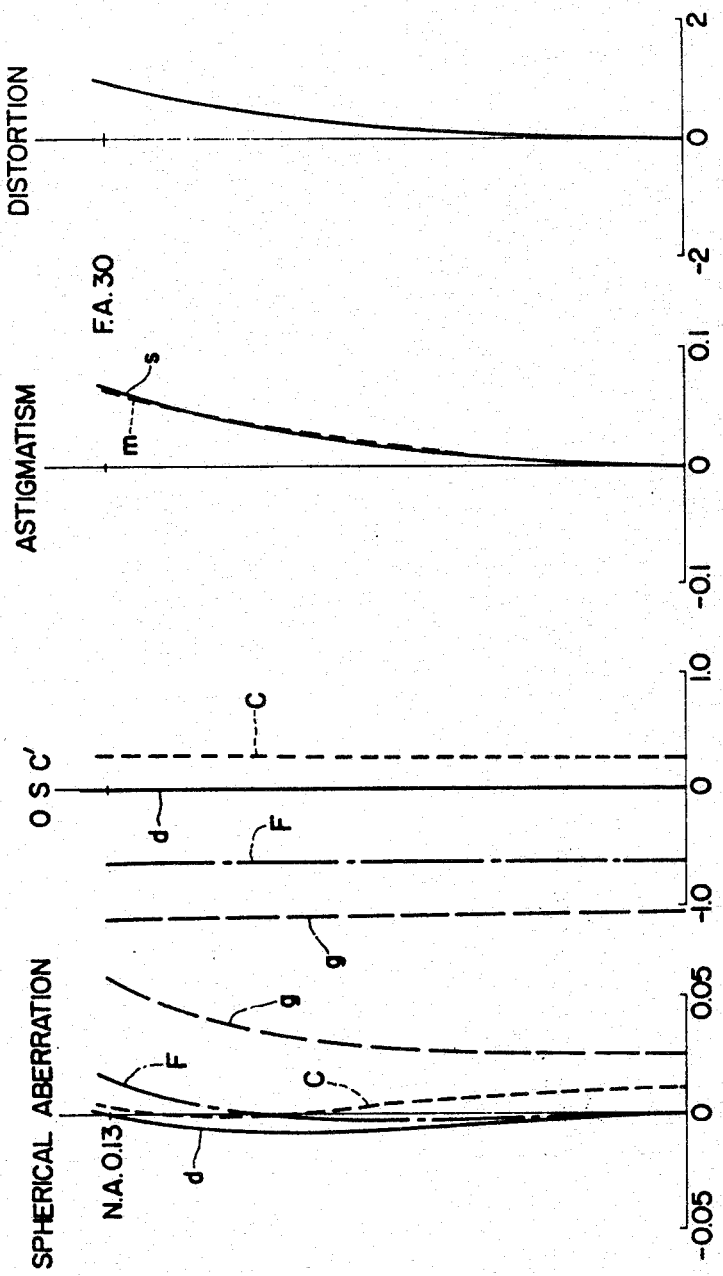
FIG. 7 shows graphs visualizing the aberration characteristics of the Embodiment 4.
Figure 8:
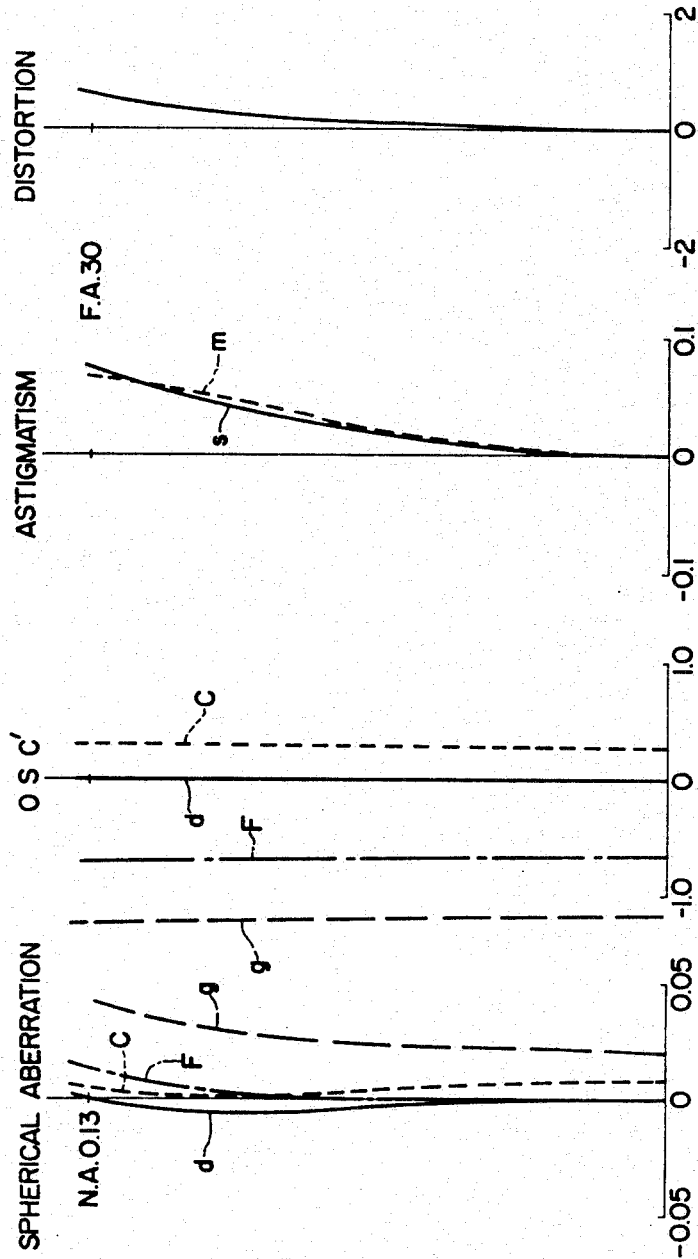
FIG. 8 shows curves visualizing the aberration characteristics of the Embodiment 5.
Figure 9:
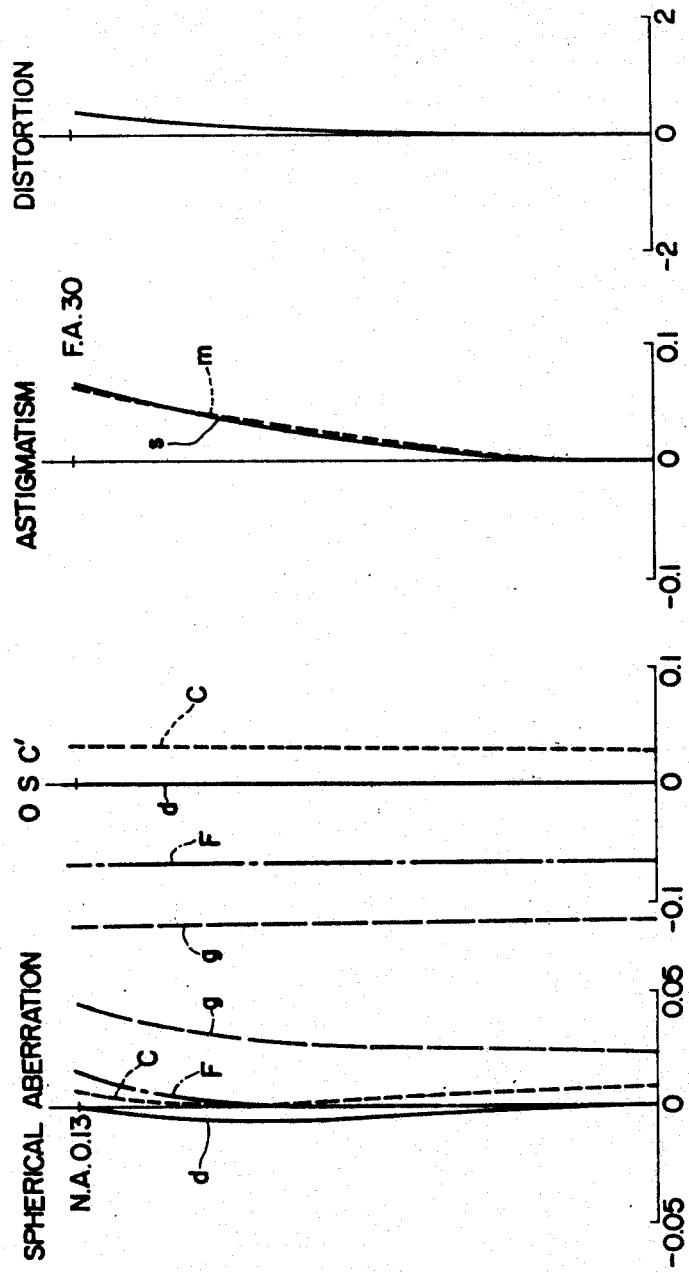
FIG. 9 shows curves illustrating the aberration characteristics of the Embodiment 6.

| | f = 1.0 | N.A. = 0.13 | W.D. = 0.4286 |
|---|---|---|---|
| $r_5 = 0.1663$ | | | |
| | $d_5 = 0.1513$ | | |
| $r_6 = -0.1478$ | | | |
| | $d_6 = 0.3137$ | $n_4 = 1.64769$ | $\nu_4 = 33.80$ |
| $r_7 = 1.2115$ | | | |
| | $d_7 = 0.1124$ | $n_5 = 1.49250$ | $\nu_5 = 81.90$ |
| $r_8 = -0.3252$ | | | |
| | $d_8 = 0.0226$ | | |
| $r_9 = 2.1795$ | | | |
| | $d_9 = 0.0849$ | $n_6 = 1.62041$ | $\nu_6 = 60.27$ |
| $r_{10} = -0.9458$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element. Of the embodiments described above, Embodiments 1 and 2 have such compositions as are shown in FIG. 1, whereas Embodiment 3 has such a composition as is shown in FIG. 4. That is to say, all of these embodiments comprise a cemented meniscus lens as the second lens component. The Embodiment 4 is an objective lens system having such a composition as shown in FIG. 6 in which the second lens component is a single meniscus lens element and the reference symbols $r_4$, $d_4$, $n_3$ or $\nu_3$ are skipped. Further, the Embodiments 5 and 6 are objective lens systems so composed as shown in FIG. 4.

As is clearly understood from the foregoing descriptions and embodiments, the objective lens system according to the present invention has a larger N.A. value and a longer working distance than those of the conventional objective lens systems of the similar types. Further, in contrast to the conventional objective lens systems of this type which produced relatively remarkable spherical aberration for g line, the objective lens system according to the present invention can reduce spherical aberration to about half the level, and correct coma and astigmatic difference more favorably.

I claim:

1. An objective lens system for microscopes comprising a first positive lens component, a second meniscus lens component, a third negative cemented doublet meniscus lens component and a fourth positive lens component, and said lens system satisfying the conditions enumerated hereunder:

(1) $f/4 < d_6+d_7 < f/1.5$
   (2) $0.1f < r_5 < 0.35f$
       $0.1f < -r_6 < 0.35f$
   (3) $\nu_2 > 40$
       $\nu_5, \nu_6 > 55$
       $\nu_4 < 40$ wherein the reference symbol $d_6+d_7$ represents thickness of the third lens component, the reference symbols $r_5$ and $r_6$ designate radii of curvature on the image side surface of the second lens component and on the object side surface of the third lens component respectively, the reference symbols $\nu_2$, $\nu_4$, $\nu_5$, $\nu_6$ denote Abbe's numbers of the second lens component, both the elements of the third lens component and the fourth lens component respectively and the reference symbol f represents total focal length of the lens system as a whole.

2. An objective lens system for microscopes according to claim 1 wherein said second lens component is a cemented doublet meniscus lens.

3. An objective lens system for microscopes according to claim 2 having the following numerical data:

| | f = 1.0 | N.A. = 0.13 | W.D. = 0.3638 |
|---|---|---|---|
| $r_1 = 1.0662$ | | | |
| | $d_1 = 0.0774$ | $n_1 = 1.66250$ | $\nu_1 = 49.60$ |
| $r_2 = -0.5293$ | | | |
| | $d_2 = 0.0285$ | | |
| $r_3 = 0.2136$ | | | |
| | $d_3 = 0.0892$ | $n_2 = 1.75500$ | $\nu_2 = 52.33$ |
| $r_4 = 0.8616$ | | | |
| | $d_4 = 0.0334$ | $n_3 = 1.73520$ | $\nu_3 = 41.08$ |
| $r_5 = 0.1374$ | | | |
| | $d_5 = 0.1628$ | | |
| $r_6 = -0.1352$ | | | |
| | $d_6 = 0.2434$ | $n_4 = 1.59270$ | $\nu_4 = 35.29$ |
| $r_7 = 0.8439$ | | | |
| | $d_7 = 0.0941$ | $n_5 = 1.49700$ | $\nu_5 = 81.34$ |
| $r_8 = -0.2823$ | | | |
| | $d_8 = 0.0214$ | | |
| $r_9 = 8.8577$ | | | |
| | $d_9 = 0.1143$ | $n_6 = 1.62041$ | $\nu_6 = 60.27$ |
| $r_{10} = -0.6290$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

4. An objective lens system for microscopes according to claim 2 having the following numerical data:

| | f = 1.0 | N.A. = 0.13 | W.D. = 0.3603 |
|---|---|---|---|
| $r_1 = 0.9961$ | | | |
| | $d_1 = 0.0713$ | $n_1 = 1.79500$ | $\nu_1 = 45.27$ |
| $r_2 = -0.6766$ | | | |
| | $d_2 = 0.0238$ | | |
| $r_3 = 0.2095$ | | | |
| | $d_3 = 0.0911$ | $n_2 = 1.75500$ | $\nu_2 = 52.33$ |
| $r_4 = 0.7694$ | | | |
| | $d_4 = 0.0371$ | $n_3 = 1.73520$ | $\nu_3 = 41.08$ |
| $r_5 = 0.1352$ | | | |
| | $d_5 = 0.1771$ | | |
| $r_6 = 0.1362$ | | | |
| | $d_6 = 0.2283$ | $n_4 = 1.59270$ | $\nu_4 = 35.29$ |
| $r_7 = 0.8967$ | | | |
| | $d_7 = 0.0797$ | $n_5 = 1.49700$ | $\nu_5 = 81.34$ |
| $r_8 = -0.2796$ | | | |
| | $d_8 = 0.0146$ | | |
| $r_9 = 6.5466$ | | | |
| | $d_9 = 0.1098$ | $n_6 = 1.62041$ | $\nu_6 = 60.27$ |
| $r_{10} = -0.5686$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

5. An objective lens system for microscopes according to claim 2 having the following numerical data:

|  | f = 1.0 | N.A. = 0.13 | W.D. = 0.4190 |
|---|---|---|---|
| $r_1 = 3.3947$ | | | |
| | $d_1 = 0.0894$ | $n_1 = 1.80610$ | $\nu_1 = 40.95$ |
| $r_2 = -0.6104$ | | | |
| | $d_2 = 0.0249$ | | |
| $r_3 = 0.2267$ | | | |
| | $d_3 = 0.0991$ | $n_2 = 1.77250$ | $\nu_2 = 49.60$ |
| $r_4 = -0.3508$ | | | |
| | $d_4 = 0.0275$ | $n_3 = 1.72000$ | $\nu_3 = 42.08$ |
| $r_5 = 0.1658$ | | | |
| | $d_5 = 0.1362$ | | |
| $r_6 = -0.1420$ | | | |
| | $d_6 = 0.2922$ | $n_4 = 1.59270$ | $\nu_4 = 35.29$ |
| $r_7 = 0.7763$ | | | |
| | $d_7 = 0.1122$ | $n_5 = 1.49700$ | $\nu_5 = 81.34$ |
| $r_8 = -0.3476$ | | | |
| | $d_8 = 0.0213$ | | |
| $r_9 = 3.2004$ | | | |
| | $d_9 = 0.1253$ | $n_6 = 1.62041$ | $\nu_6 = 60.27$ |
| $r_{10} = -0.7606$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

6. An objective lens system for microscopes according to claim 1 having the following numerical data:

|  | f = 1.0 | N.A. = 0.13 | W.D. = 0.3781 |
|---|---|---|---|
| $r_1 = 1.5323$ | | | |
| | $d_1 = 0.0758$ | $n_1 = 1.75500$ | $\nu_1 = 52.33$ |
| $r_2 = -0.5965$ | | | |
| | $d_2 = 0.0075$ | | |
| $r_3 = 0.1647$ | | | |
| | $d_3 = 0.0659$ | $n_2 = 1.77250$ | $\nu_2 = 49.60$ |
| $r_5 = 0.1435$ | | | |
| | $d_5 = 0.2139$ | | |
| $r_6 = -0.1196$ | | | |
| | $d_6 = 0.2262$ | $n_4 = 1.59270$ | $\nu_4 = 35.29$ |
| $r_7 = 0.7513$ | | | |
| | $d_7 = 0.1088$ | $n_5 = 1.49250$ | $\nu_5 = 81.90$ |
| $r_8 = -0.2819$ | | | |
| | $d_8 = 0.0262$ | | |
| $r_9 = 10.9245$ | | | |
| | $d_9 = 0.1125$ | $n_6 = 1.62041$ | $\nu_6 = 60.27$ |
| $r_{10} = -0.6141$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

7. An objective lens system for microscopes according to claim 2 having the following numerical data:

|  | f = 1.0 | N.A. = 0.13 | W.D. = 0.4327 |
|---|---|---|---|
| $r_1 = 0.4378$ | | | |
| | $d_1 = 0.0788$ | $n_1 = 1.75500$ | $\nu_1 = 52.33$ |
| $r_2 = -1.5332$ | | | |
| | $d_2 = 0.0072$ | | |
| $r_3 = 0.2984$ | | | |
| | $d_3 = 0.0719$ | $n_2 = 1.76200$ | $\nu_2 = 40.20$ |
| $r_4 = -0.6620$ | | | |
| | $d_4 = 0.0249$ | $n_3 = 1.61340$ | $\nu_3 = 43.84$ |
| $r_5 = 0.1665$ | | | |
| | $d_5 = 0.1372$ | | |
| $r_6 = -0.1427$ | | | |
| | $d_6 = 0.3226$ | $n_4 = 1.66680$ | $\nu_4 = 33.04$ |
| $r_7 = 1.3593$ | | | |
| | $d_7 = 0.1094$ | $n_5 = 1.49700$ | $\nu_5 = 81.60$ |
| $r_8 = -0.3215$ | | | |
| | $d_8 = 0.0214$ | | |
| $r_9 = 2.1861$ | | | |
| | $d_9 = 0.0864$ | $n_6 = 1.62041$ | $\nu_6 = 60.27$ |
| $r_{10} = -0.9447$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

8. An objective lens system for microscopes according to claim 2 having the following numerical data:

|  | f = 1.0 | N.A. = 0.13 | W.D. = 0.4286 |
|---|---|---|---|
| $r_1 = 0.4452$ | | | |
| | $d_1 = 0.0779$ | $n_1 = 1.80610$ | $\nu_1 = 40.95$ |
| $r_2 = -2.3115$ | | | |
| | $d_2 = 0.0071$ | | |
| $r_3 = 0.2937$ | | | |
| | $d_3 = 0.0698$ | $n_2 = 1.77250$ | $\nu_2 = 40.60$ |
| $r_4 = -0.9199$ | | | |
| | $d_4 = 0.0246$ | $n_3 = 1.61340$ | $\nu_3 = 43.84$ |
| $r_5 = 0.1663$ | | | |
| | $d_5 = 0.1513$ | | |
| $r_6 = -0.1478$ | | | |
| | $d_6 = 0.3137$ | $n_4 = 1.64769$ | $\nu_4 = 33.80$ |
| $r_7 = 1.2115$ | | | |
| | $d_7 = 0.1124$ | $n_5 = 1.49250$ | $\nu_5 = 81.90$ |
| $r_8 = -0.3252$ | | | |
| | $d_8 = 0.0226$ | | |
| $r_9 = 2.1795$ | | | |
| | $d_9 = 0.0849$ | $n_6 = 1.62041$ | $\nu_6 = 60.27$ |
| $r_{10} = -0.9458$ | | | | wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens element.

* * * * *